(12) United States Patent
Belanger et al.

(10) Patent No.: US 8,613,590 B2
(45) Date of Patent: Dec. 24, 2013

(54) BLADE OUTER AIR SEAL AND REPAIR METHOD

(75) Inventors: Philip R. Belanger, Acton, ME (US); Susan M. Tholen, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 739 days.

(21) Appl. No.: 12/844,344

(22) Filed: Jul. 27, 2010

(65) Prior Publication Data

US 2012/0027574 A1 Feb. 2, 2012

(51) Int. Cl.
*F04D 29/08* (2006.01)

(52) U.S. Cl.
USPC ........ 415/137; 415/138; 415/139; 415/173.2; 415/173.3; 415/173.4; 415/174.1; 415/174.2; 415/200; 29/889.1; 29/889.2

(58) Field of Classification Search
USPC .......... 415/170.1, 173.1, 173.2, 173.4, 173.6, 415/173.7, 174.1, 174.2, 134, 137, 138, 415/139, 200; 29/889.2, 889.1
See application file for complete search history.

(56) References Cited

U.S. PATENT DOCUMENTS

| | | | |
|---|---|---|---|
| 4,820,119 A | * | 4/1989 | Joyce .......................... 415/173.7 |
| 7,306,424 B2 | | 12/2007 | Romanov et al. |
| 7,553,128 B2 | | 6/2009 | Abdel-Messeh et al. |
| 7,721,433 B2 | | 5/2010 | Thompson et al. |
| 2004/0047725 A1 | * | 3/2004 | Tomita et al. ................. 415/116 |
| 2007/0122269 A1 | * | 5/2007 | Meier et al. ................. 415/173.1 |
| 2008/0209726 A1 | * | 9/2008 | Powers .................... 29/889.1 |
| 2009/0271983 A1 | | 11/2009 | Rose et al. |
| 2010/0247291 A1 | * | 9/2010 | Tholen et al. ................. 415/116 |

* cited by examiner

*Primary Examiner* — Igor Kershteyn
(74) *Attorney, Agent, or Firm* — Miller, Matthias & Hull LLP

(57) ABSTRACT

An article of manufacture has a body formed in part of a first metal alloy and in part of a second metal alloy, the second metal alloy having a thermal coefficient of expansion that is less than the thermal coefficient of expansion of the first metal alloy. A BOAS segment for a gas turbine engine is disclosed wherein the formation of cracks due to thermal mechanical fatigue in the body of the disclosed BOAS segment is minimized, if not eliminated, through a unique construction of the disclosed BOAS segment, whether original equipment manufacture or a repaired blade outer air seal. A method for manufacture of a BOAS segment and a method for modifying a BOAS segment are disclosed.

17 Claims, 4 Drawing Sheets

BLADE OUTER AIR SEAL AND REPAIR METHOD

FIELD OF THE INVENTION

This invention relates generally to gas turbine engines and, more particularly, to a blade outer air seal for a gas turbine engine and a method for restoration of a blade outer air seal for a gas turbine engine.

BACKGROUND OF THE INVENTION

Gas turbine engines, such as those used to power modern commercial aircraft or in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor.

In operation of a gas turbine engine, fuel is combusted in the combustor in compressed air from the compressor thereby generating high-temperature combustion exhaust gases, which pass through the turbine. In the turbine, energy is extracted from the combustion exhaust gases to turn the turbine to drive the compressor and also to produce thrust. The turbine includes a plurality of turbine stages, wherein each stage includes of a stator section formed by a row of stationary vanes followed by a rotor section formed by a row of rotating blades. In each turbine stage, the upstream row of stationary vanes directs the combustion exhaust gases against the downstream row of blades. Thus, the blades of the turbine are exposed to the high temperature exhaust gases.

The turbine blades extend outwardly from a blade root attached to a turbine rotor disk to a blade tip at the distal end of the blade. A blade outer air seal extends circumferentially about each turbine rotor section in juxtaposition to the blade tips. Desirably, a tight clearance is maintained between the blade tips and the radially inwardly facing inboard surface of the blade outer air seal so as to minimize passage of the hot gases therebetween. Hot gas flowing between the blade tips and the blade outer air seal bypasses the turbine, thereby reducing turbine efficiency.

In operation of the gas turbine engine, the blade outer air seal is exposed to the hot gases flowing through the turbine. The blade outer air seal is constructed of a plurality of blade outer air seal (BOAS) segments having longitudinal expanse and circumferential expanse and laid end-to-end abutment in a circumferential band about the turbine rotor so as to circumscribe the blade tips. Consequently, it is customary practice to provide for cooling of the BOAS segments, typically using cooler temperature bleed air taken from elsewhere in the engine. Various methods of cooling the BOAS segments are currently in use and typically include impinging the cooler bleed air against the outboard back side of each BOAS segment and commonly also passing cooler bled air through a plurality of air flow passages formed within the body of each BOAS segment. Despite the cooling of the BOAS segments, in the harsh thermal environment to which the blade outer air seal is exposed, particularly in the high pressure turbine section located immediately aft of the combustion chamber, the BOAS segments may over repeated thermal cycles of exposure to the hot gases crack due thermal mechanical fatigue.

Due to the harsh thermal environment, each BOAS segment is made of a high temperature superalloy material, such as single crystal nickel alloys. During engine operation, the radially inboard facing side (ID surface) of each BOAS segment heats up due to exposure to the hot gases passing through the turbine and tries to expand. Since the radially outboard facing side (OD surface) and typically the internal structure of the body of each BOAS segment is exposed to cooling air while the radially inboard facing side of the body of each BOAS segment is exposed directly to the hot gases passing through the turbine section, the BOAS segments are subject to differential thermal expansion. That is, the radially inboard facing side of the body of each BOAS segment, due to exposure to a higher temperature than the radially outboard side, undergoes thermal expansion at a higher rate than the outboard side of the body of the BOAS segment, thereby putting the radially inboard facing side of each BOAS segment into a compressive stress state that at high temperature may exceed the yield point of the material. Upon cooling, residual tensile stress are produced in the material that yielded in the radially inboard side of body at high temperature. After repeated thermal cycling, the residual tensile stresses can form thermal mechanical fatigue cracks on the radially inboard surface of the BOAS segment, which may necessitate premature removal of the engine from service to remove and replace cracked and damaged segments of the blade outer air seal.

Accordingly, there is a need for a blade outer air seal segment that is less prone to cracking due to thermal mechanical fatigue resulting from differential thermal expansion during engine cycling.

SUMMARY OF THE INVENTION

An article of manufacture includes a body having a circumferential expanse and a longitudinal expanse, a radially outwardly facing side and a radially inwardly facing side. The body excepting at least a portion of the inwardly facing side of the body is formed of a first metal alloy having a first coefficient of thermal expansion, while the aforesaid portion of the inwardly facing side is formed of a second metal alloy having a second coefficient of thermal expansion. The second coefficient of thermal expansion is less than the first coefficient of thermal expansion. The portion of the inwardly facing side of the body formed of the second metal alloy extends across the full circumferential expanse and may extend across the full longitudinal expanse or a central portion of longitudinal expanse of the inwardly facing side of the body. The portion of the inwardly facing side of the body formed of the second metal alloy may include a deposit of the second metal alloy in a recess formed in a portion of the inwardly facing side of the body.

A BOAS segment for a gas turbine engine is provided having a body formed in part of a first metal alloy and in part of a second metal alloy, the second metal alloy having a thermal coefficient of expansion that is less than the thermal coefficient of expansion of the first metal alloy. The body of the BOAS segment has an outwardly facing side and an inwardly facing side having a circumferential expanse and a longitudinal expanse. The body, excepting a portion of the radially inwardly facing side, is formed of a first metal alloy having a first coefficient of thermal expansion, while that portion is formed of a second metal alloy having a second coefficient of thermal expansion. The second coefficient of thermal expansion of is less than the first coefficient of thermal expansion. The second metal alloy may be a metal alloy having a second coefficient of thermal expansion less than the coefficient of expansion of the first metal alloy at body temperatures in excess of about 1850° F. (1010° C.).

In an embodiment, the second metal alloy is deposited in a recess formed in the body having a circumferential expanse that extends across the full circumferential expanse of the inwardly facing side of the body and a longitudinal expanse that extends across a central region of the inwardly facing side of the body to encompass at least the hot rub strip region on the inwardly facing side of the body. The BOAS segment in accord with the invention may be an original equipment manufacture or a repaired BOAS segment. In an embodiment of an original equipment manufacture BOAS segment, the deposit of the second metal alloy may extend across the full circumferential expanse and the full longitudinal expanse of the inwardly facing side of the body of the BOAS segment. The formation of cracks due to thermal mechanical fatigue in a BOAS segment for a gas turbine engine is minimized, if not eliminated, through a unique construction of the BOAS segment, whether original equipment manufacture or a repaired blade outer air seal.

A method is provided for modifying a BOAS segment for a gas turbine engine includes the steps of: removing a layer of a first metal alloy from an inwardly facing side of the body the seal element thereby creating a recess having a circumferential expanse and a longitudinal expanse; and filling the recess with a second metal alloy, the second metal alloy having a thermal coefficient of expansion less than a thermal coefficient of expansion of the first metal alloy. In an aspect of the method, the longitudinal expanse of the recess encompasses at least the hot rub strip region on the inwardly facing side of the body. The step of filling the recess with a second metal alloy may include depositing the second metal alloy into the recess as a weld deposit. The step of removing a layer of the first metal alloy may include creating the recess by at least one of cutting and grinding away of the first metal alloy in a central portion of the inwardly facing side of the body.

A method for manufacturing a blade outer seal segment for a gas turbine includes the steps of: forming a body having an outwardly facing side and an inwardly facing side having a circumferential expanse and a longitudinal expanse, the body formed of a first metal alloy having a first coefficient of thermal expansion; and providing a layer of a second metal alloy on the inwardly facing side, the second metal alloy having a second coefficient of thermal expansion, the second coefficient of thermal expansion being less than the first coefficient of thermal expansion. The step of providing a layer of a second metal alloy on the inwardly facing side includes providing a layer of second metal alloy having a longitudinal expanse encompassing a hot rub strip region on a longitudinal expanse of the inwardly facing side of the body.

BRIEF DESCRIPTION OF THE DRAWINGS

For a further understanding of the invention, reference will be made to the following detailed description of the invention which is to be read in connection with the accompanying drawing, where.

DETAILED DESCRIPTION OF THE INVENTION

Figure 1:
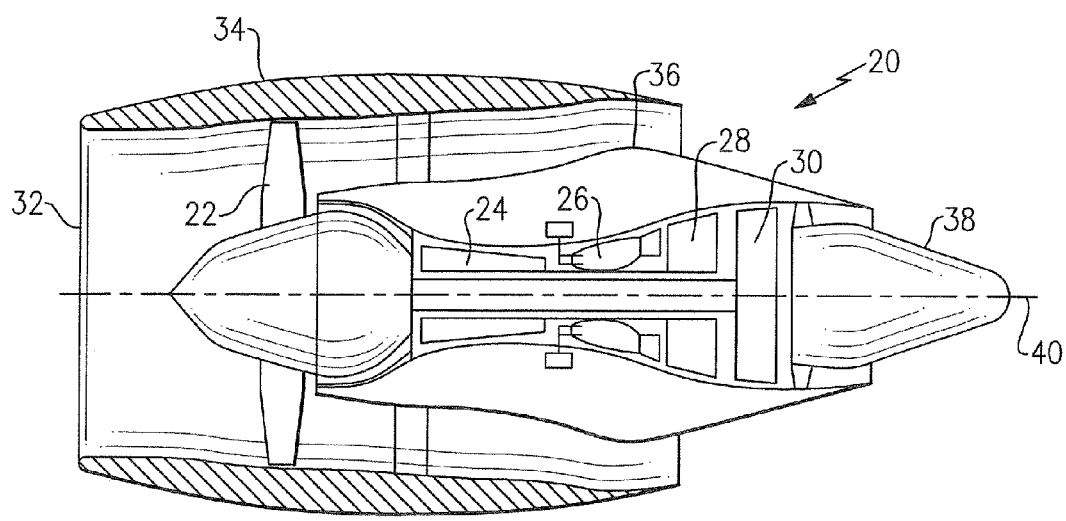
FIG. 1 is a schematic view of a longitudinal section of an exemplary embodiment of a turbofan gas turbine engine.

Referring now in FIG. 1, there is shown an exemplary embodiment of a turbofan gas turbine engine, designated generally as 20, that includes, from fore-to-aft, a fan 22, a compressor module 24, a combustor module 26, a high pressure turbine module 28, a low pressure turbine module 30 and an exhaust nozzle. A nacelle forms a housing or wrap that surrounds the gas turbine engine 20 to provide an aerodynamic housing about gas turbine engine. In the turbofan gas turbine engine 20 depicted in the drawings, the nacelle includes, from fore to aft, the engine inlet 32, the fan cowl 34, the engine core cowl 36 and the primary exhaust nozzle 38. The high pressure turbine module 28 and the low pressure turbine module 30 are disposed within the engine core cowling 36 aft of the combustor module 26 and include a plurality of turbine stages coaxially disposed in an axial array about a central longitudinal axis 40. It is to be understood that the BOAS segment and the method for restoration of a BOAS segment as disclosed herein are not limited in application to the depicted embodiment of a gas turbine engine, but is applicable to other types of gas turbine engines, including other types of aircraft gas turbine engines, as well as industrial and power generation gas turbine engines.

Figure 2:
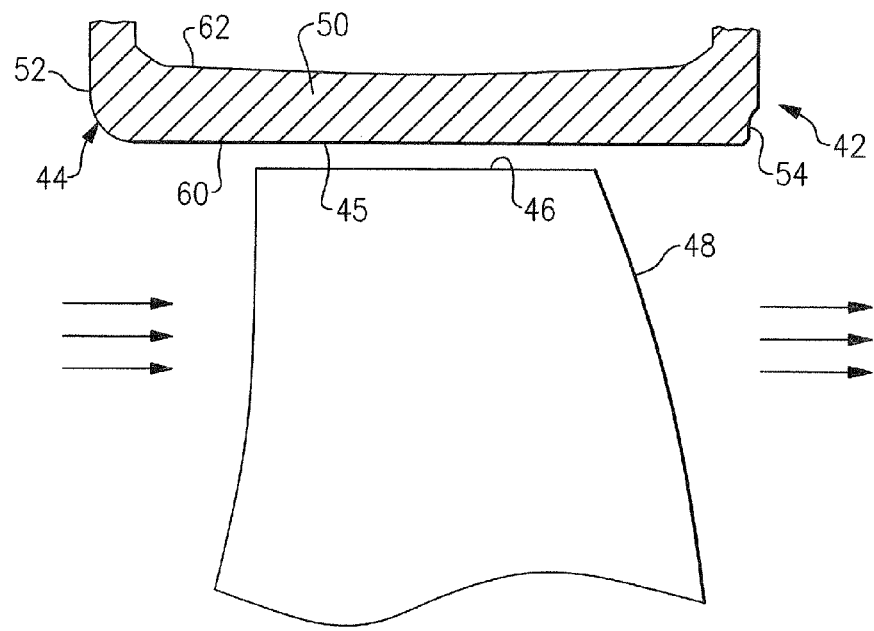
FIG. 2 is an elevation view, partly in section, of the area of interface between a blade outer air seal and the tip of a turbine blade.

Referring now to FIG. 2, blade outer air seal 42, formed of a plurality of BOAS segments 44 laid circumferential end-to-circumferential end, circumscribes each turbine rotor of both the high pressure turbine module 28 and the low pressure turbine module 30. The radially inboard surface of the blade outer air seal 42 is disposed in close proximity to the distal tips 46 of a plurality of turbine blades 48 (one blade shown in FIG. 2) that extend generally radially outward from a rotor disk (not shown) disposed about the longitudinal axis 40. When the engine 20 is in operation, the turbine blades 48 are exposed to the hot combustion products passing from the combustor module through the turbine modules. As a result, the rotating turbine blades grow outwardly and the distal tips 46 of the blades 48 closer approach and may contact a portion of the surface, termed the hot rub strip region 45, on the radially inboard sides of the BOAS segments 44, thereby sealing the gap between the distal tips 46 of the turbine blades 48 and the blade outer air seal to minimize bypassing of the hot gases past the turbine blades.

Figure 3:
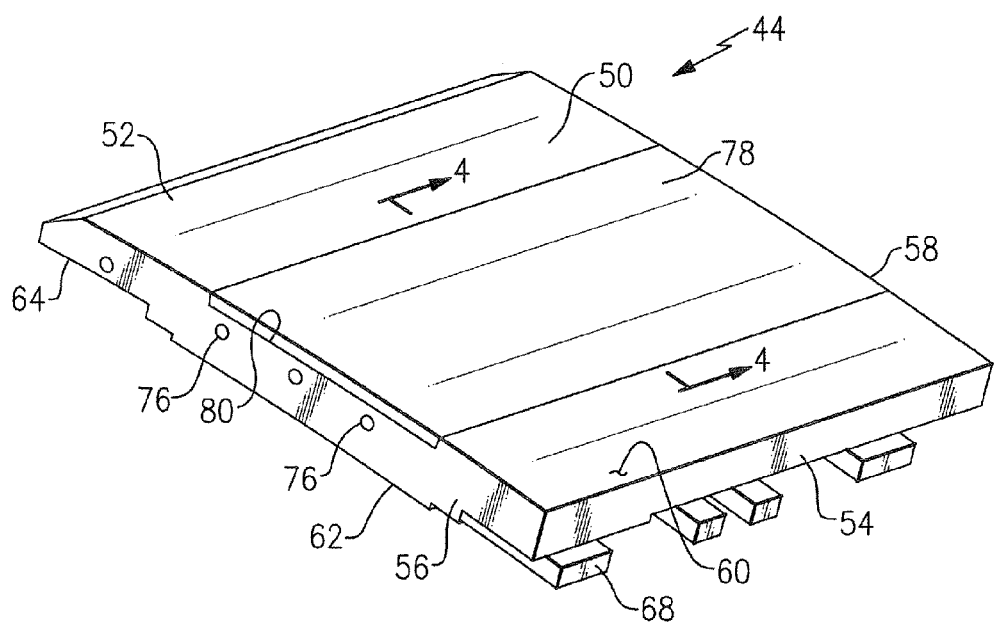
FIG. 3 is a perspective view of an exemplary embodiment of a BOAS segment as disclosed herein showing the radially inward face thereof.
Figure 4:
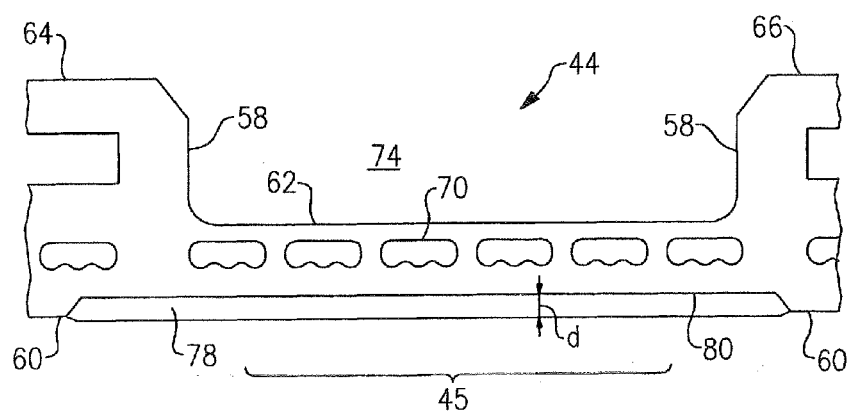
FIG. 4 is a longitudinal sectional side elevation view of the BOAS segment of FIG. 3 taken substantially along line 4-4.
Figure 7:
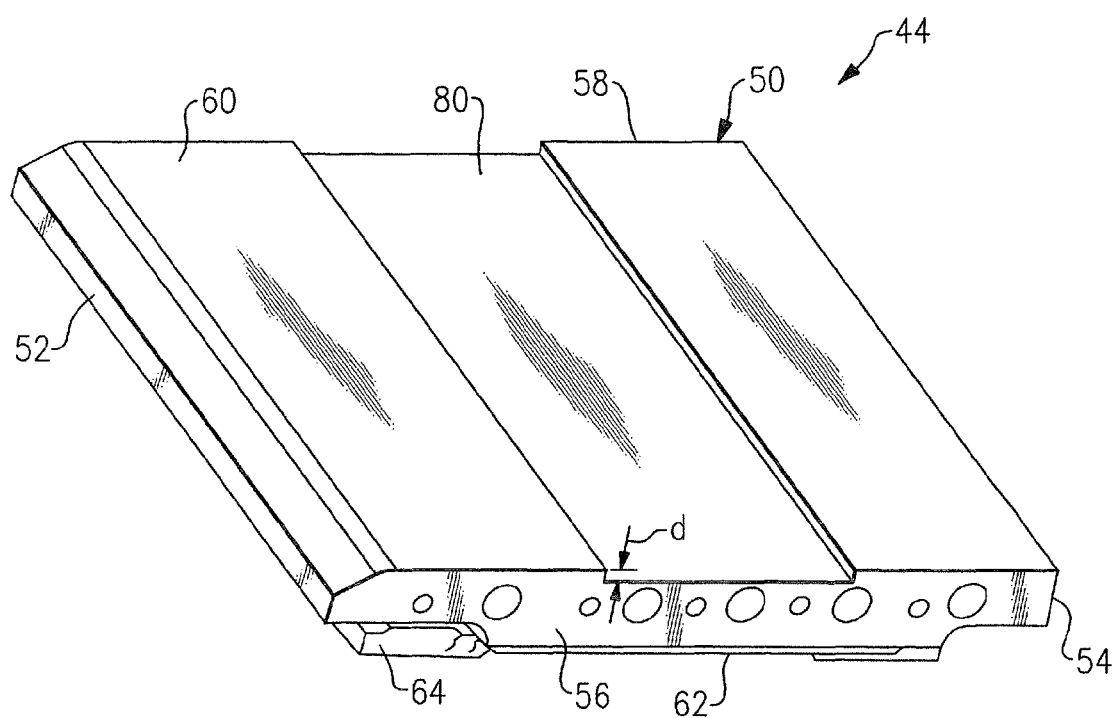
FIG. 7 is perspective view of the BOAS segment of FIG. 5 showing the radially inward face thereof prepared for restoration in accord with the method disclosed herein.

As noted previously, the blade outer air seal 42 comprises a circumferential ring array of a plurality of BOAS segments 44. Referring now to FIGS. 3, 4 and 7, each BOAS segment 44 has a body 50 having a longitudinal expanse extending between a leading longitudinal end 52 and a trailing longitudinal end 54 and a circumferential expanse extending between a first circumferential end 56 and a second circumferential end 58. It is to be understood that the longitudinal direction corresponds to the axial direction relative to the gas turbine engine axis when the BOAS segment 44 is installed. When the BOAS segment is installed, the leading longitudinal end 52 constitutes the axially forward or upstream end and the trailing longitudinal end 54 constitutes the axially aft or downstream end. The body 50 has a radially inward facing side 60, also referred to as an ID face, and a radially outward facing side 62, also referred to as an OD face. When the BOAS segment is installed in the gas turbine engine, the ID face 60 is directly exposed to the hot combustion gases passing through the turbine module.

When arrayed in a circumferential ring to form the blade outer air seal, the first circumferential end 56 of one segment 44 and the second circumferential end 58 of the next adjacent segment mutually engage a seal (not shown) spanning the junction between adjacent BOAS segments 44. Additionally, each BOAS segment 44 further includes a forward mounting hook 64 and an aft mounting hook 66, both formed integrally with the perimeter wall 68 of the body 50 on the OD face 62. The forward mounting hook 64 has a distal portion projecting forwardly outboard of and into spaced relationship over the leading longitudinal end 52 of the body 50. The aft mounting hook 66 has a distal portion projecting aftwardly outboard of and in spaced relationship over the trailing longitudinal end 54 of the body 50. The BOAS segments 44, when arrayed in the form of a circumferential ring, are supported from the engine superstructure (not shown) by means of their respective forward mounting hooks 64 and aft mounting hooks 66 engaging cooperating members (not shown) of the engine superstructure.

When in service, the BOAS segments 44 will be exposed to a very high temperature environment, particularly within the high pressure turbine module of a gas turbine engine. Therefore, the BOAS segments 44 are designed to be cooled by bleed air from a higher pressure, cooler temperature section of the engine, such as the compressor module. For example, the body 50 of the BOAS segment 44 may be provided with a plurality of cooling air passages 70 formed within the body 50. The cooling air passages 70 extend in fluid communication between a chamber 74 on the OD face 62 and the cooling air outlets 76 disposed about the periphery of the body 50. To cool the body 50 of the BOAS segment 44, the higher pressure, cooler temperature bleed air is directed into the chamber 74 to impinge upon the OD face 62 of the body 50 and pass into and through the cooling air passages 70 and out the cooling air outlets 76.

As noted previously, conventional BOAS segments are formed of a single material, commonly a superalloy, such as a nickel based superalloy. However, the BOAS segment 44 disclosed herein has a body formed in part of a first material and in part of a second material. More specifically, the major part of the body 50 of the BOAS segment 44 is formed of a first material having a first coefficient of thermal expansion, while a portion 78 of the body 50 on the ID face 60, i.e. radially inwardly facing side, of the body 50 is formed of a second material having a second coefficient of thermal expansion that is less than the first coefficient of thermal expansion at least at body temperatures that could result thermal mechanical fatigue cracking from residual stresses resulting from differential thermal expansion over repeated thermal cycles.

Figure 5:
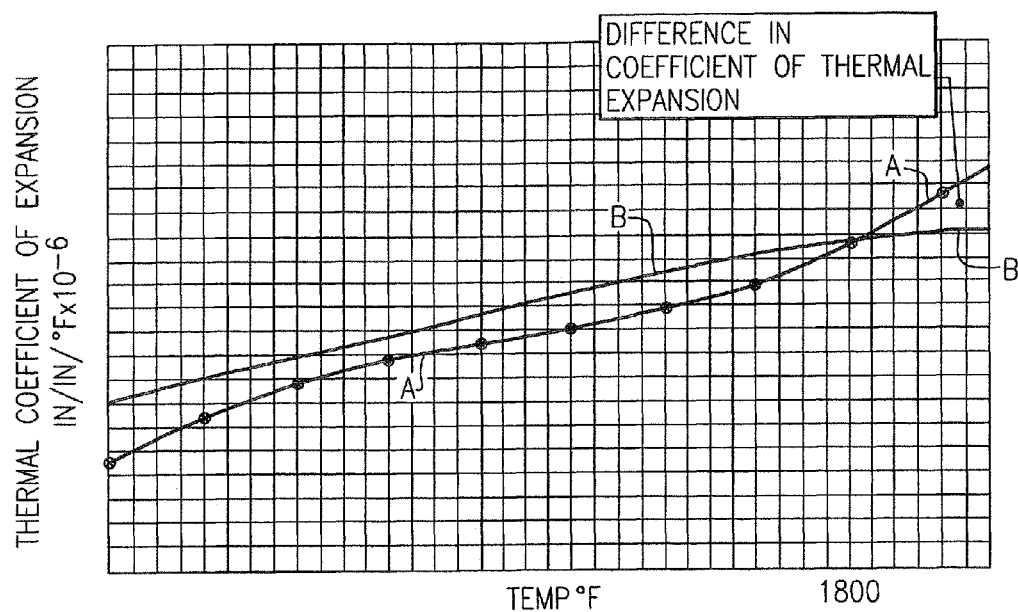
FIG. 5 is a graphical illustration showing a comparison of the coefficient of thermal expansion of a first metal alloy and a second metal alloy with respect to variation with body temperature.

In an embodiment, the second metal alloy has a coefficient of thermal expansion less than the coefficient of thermal expansion at body temperatures in excess of about 1850° F. (1010° C.). For example, referring now to FIG. 5, there are depicted curves A and B. Curve A illustrates a representative variation of the coefficient of thermal expansion with material temperature for an exemplary first metal alloy of which the main part of the body 50 of the BOAS segment 44 may be formed. Curve B illustrates a representative variation of the coefficient of thermal expansion with material temperature for an exemplary second metal alloy of which the portion 78 of the body 50 of the BOAS segment 44 may be formed.

As illustrated, at higher material temperatures, that is at material temperatures in excess of about 1850° F. (1010° C.), the coefficient of thermal expansion of the second metal alloy (curve B) is less than the coefficient of thermal expansion of the first metal alloy. The fact that the coefficient of thermal expansion associated with the second metal alloy exceeds that associated with the first metal alloy at lower material temperatures, for example material temperatures less than about 1800° F. (982° C.), is not relevant as at such lower material temperatures, the residual stresses resulting in thermal mechanical fatigue would not normally be developed despite the differential thermal expansion since compressive stresses exceeding the yield point of the first metal alloy would not typically be experienced at material temperatures below about 1800° F. (982° C.). For example, the first metal alloy may be a conventional nickel based superalloy and the second metal alloy may be a conventional cobalt based superalloy.

These superalloys have the necessary oxidation resistance at exposure temperatures for exposure to the hot combustion gases passing through the turbine modules of the gas turbine engine. It is to be understood, however, that other materials, including other superalloys, suitable for use, e.g. the necessary oxidation resistance at exposure temperatures, within the harsh environment experienced in the turbine modules of gas turbine engines may be used. Both the first metal alloy and the second metal alloy need to have sufficient oxidation resistance at exposure temperature to avoid deterioration over the projected service life of the BOAS segments. However, since the structural integrity of the BOAS segment 44 is being maintained by the first metal alloy forming the main part of the body 50, the second metal alloy forming the layer 78 may have a lower tensile strength, lower creep resistance and lesser structural strength characteristics in general in comparison to the first metal alloy The BOAS segment 44 as disclosed herein may be an original equipment manufacture or a repaired BOAS segment. In either case, the portion 78 may be confined to a recess 80 created in the ID face 60. If an original equipment manufacture, a recess 80 having a desired longitudinal expanse, a desired circumferential expanse and a desired depth, d, may be formed in the body 50 during the manufacturing process as part of the original casting or machined into the body 50 as a step in the manufacturing process. The layer 78 of second metal alloy is then deposited into the recess 80, for example by conventional low heat fusion welding techniques, to fill the recess 80 as a step in the original equipment manufacture process. The surface of the deposited layer 78 may be machined by cutting and/or grinding and/or other machining method to provide a desired surface contour to the rub surface.

The portion 78 of the ID face 60 of second metal alloy having a lesser coefficient of thermal of thermal expansion than the first metal alloy should have an expanse extending over at least the hottest region of the inwardly facing side of the body 50 when exposed to the hot combustion gases passing through the turbine module. The portion 78 may have a circumferential expanse that extends across the entire circumferential expanse of the inwardly facing side 60 of the body 50. Additionally, the portion 78 formed of the second metal alloy may be disposed in the central portion of the ID face 60, i.e. the inwardly facing side of the body 50, and having a longitudinal expanse encompassing at least the hot rub strip region wherein the tips of the turbine blades may come into contact during certain engine operating conditions. In an original equipment manufacture BOAS, the portion 78 formed of the second metal alloy may have an expanse extending across the entire circumferential expanse and the entire longitudinal expanse of the inwardly facing side, i.e. the ID face 60, of the body 50 of the BOAS segment. Additionally, whether an original equipment manufacture BOAS segment or a repair BOAS segment, a thermal barrier coating may be applied to the surface of the inwardly facing side 60 of the body 50 of the BOAS segment as in conventional practice, including the surface of the portion 78 formed of the second metal alloy.

Figure 6:
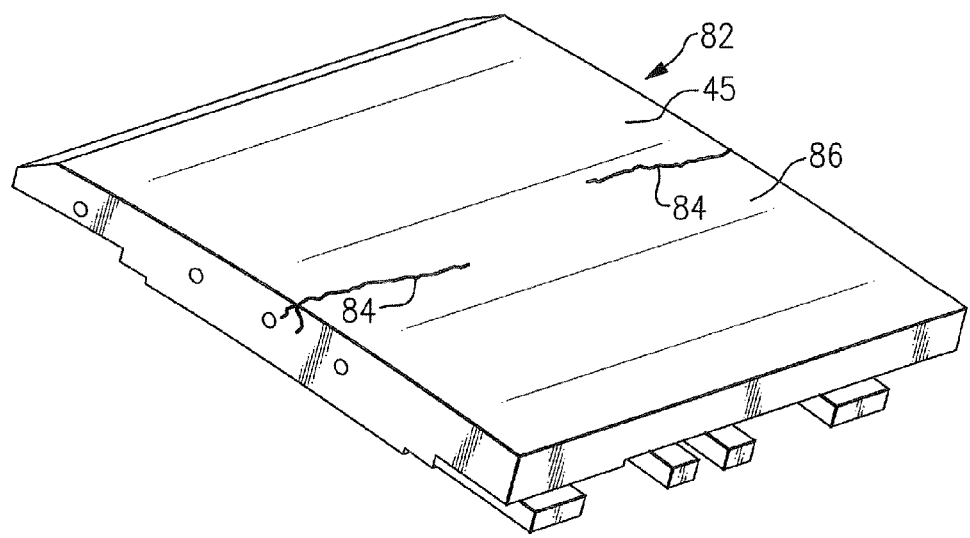
FIG. 6 is perspective view of a prior art BOAS segment showing the radially inward face thereof.

A method for the restoration of a BOAS segment 82 formed originally solely of the first metal alloy and damaged after repeated in service thermal cycling due to thermal mechanical fatigue cracking resulting from differential thermal expansion will be disclosed with reference to FIGS. 6 and 7, in particular. A damaged BOAS segment 82 exhibiting thermal mechanical fatigue cracking 84 in the rub surface area of its ID surface 86 is depicted in FIG. 6. The BOAS segment 82 is a conventional prior art blade outer air seal segment having a body formed of the first metal alloy, for example a conventional nickel based superalloy. The damaged BOAS segment 82 may be repaired in accord with the method for restoration disclosed herein.

The method includes the steps of removing a layer of the first metal alloy from the inwardly facing side, i.e. the ID face, 60, of the body of the damaged BOAS segment 82 thereby creating a recess 80 having a desired longitudinal expanse, a desired circumferential expanse and a desired depth, d, as illustrated in FIG. 7, and filling the recess 80 with the second metal alloy, which has a thermal coefficient of expansion less than a thermal coefficient of expansion of the first metal alloy, to restore the BOAS segment 82. The recess 80 may be formed by cutting, grinding or other machining method, or a combination thereof. The layer of second metal alloy may be deposited into the recess 80, for example, by conventional low heat fusion welding techniques. The surface of the deposited layer of the second metal alloy may be machined by cutting and/or grinding and/or other machining method to provide a desired surface contour to the rub surface. The restored BOAS segment will appear substantially as the BOAS segment 44 depicted in FIG. 3.

Whether in manufacturing an original equipment BOAS segment or in restoring a damaged BOAS segment, the recess 80 is formed having a desired longitudinal expanse, a desired circumferential expanse and a desired depth, d. In an embodiment, the recess 80 may be formed with a circumferential expanse extending the full circumferential expanse of the ID surface of the body of the BOAS segment and with a longitudinal expanse substantially covering the hot rub strip region in a longitudinally central portion on the ID surface of the body of the BOAS segment. For example, in an embodiment, the recess 80 may have a longitudinal expanse that extends over about 40% to about 60% of the longitudinal expanse of the ID surface of the body of the BOAS segment. The depth, d, of the recess may not extend so deep into the body of the BOAS segment as to penetrate the cooling air passages 70 or cooling air outlets 76. For example, the depth of the recess may extend about half of the distance between the ID face of the BOAS segment and the radially inward most extent of any of the cooling air passages 70, such as illustrated in FIG. 4.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the BOAS segment and the method for restoration of a BOAS segment disclosed herein have been particularly shown and described with reference to the exemplary embodiment as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. An article of manufacture comprising a body having a circumferential expanse and a longitudinal expanse, a radially outwardly facing side and a radially inwardly facing side, the body excepting at least a portion of the inwardly facing side of the body formed of a first metal alloy having a first coefficient of thermal expansion, said at least a portion of the inwardly facing side formed of a second metal alloy having a second coefficient of thermal expansion, the second coefficient of thermal expansion being less than the first coefficient of thermal expansion, wherein said at least a portion of the inwardly facing side of the body formed of the second metal alloy comprises a deposit of second metal alloy in a recess formed in a potion of the inwardly facing side of the body.

2. The article of manufacture as recited in claim 1 wherein said at least a portion of the inwardly facing side of the body formed of the second metal alloy extends across the full circumferential expanse and the full longitudinal expanse of the inwardly facing side.

3. The article of manufacture as recited in claim 1 wherein said at least a portion of the inwardly facing side of the body formed of the second metal alloy extends across the full circumferential expanse of the inwardly facing side of the body and extends across a central portion of the longitudinal expanse of the inwardly facing side of the body.

4. A blade outer air seal element for a gas turbine engine comprising:
 a body having an outwardly facing side and an inwardly facing side having a circumferential expanse and a longitudinal expanse, the body formed of a first metal alloy having a first coefficient of thermal expansion;
 a layer of a second metal alloy disposed on the inwardly facing side, the second metal alloy having a second coefficient of thermal expansion, the second coefficient of thermal expansion being less than the first coefficient of thermal expansion; and
 wherein a recess is formed in the inwardly facing side of the body and the layer of the second metal alloy is deposited in the recess formed in the inwardly facing side.

5. The blade outer air seal segment as recited in claim 4 wherein the second metal alloy having a second coefficient of expansion comprises a metal alloy having a coefficient of expansion less than the first coefficient of expansion at body temperatures in excess of about 1850° F. (1850° C.).

6. The blade outer air seal segment as recited in claim 4 wherein the first metal alloy comprises a nickel based superalloy and the second metal alloy comprises a cobalt based superalloy.

7. The blade outer air seal segment as recited in claim 4 wherein the recess extends across the full circumferential expanse of the inwardly facing side of the body and extends across a central portion of the longitudinal expanse of the inwardly facing side of the body.

8. The blade outer air seal segment as recited in claim 7 wherein the recess extends across a central portion of the longitudinal expanse of the inwardly facing side of the body comprising from about 40% to about 60% of the longitudinal expanse of the inwardly facing side of the body.

9. The blade outer air seal segment as recited in claim 4 wherein the recess extends across the full circumferential expanse of the inwardly facing side of the body and extends across a portion of the longitudinal expanse of the inwardly facing side of the body encompassing a hot rub strip region on the longitudinal expanse of the inwardly facing side of the body.

10. A method for modifying a blade outer air seal segment for a gas turbine engine, the blade outer air seal segment having a body formed of a first metal alloy comprising the steps of:

removing a layer of the first metal alloy from an inwardly facing side of the body thereby creating a recess; and filling the recess with a second metal alloy, the second metal alloy having a thermal coefficient of expansion less than a thermal coefficient of expansion of the first metal alloy.

11. The method as recited in claim 10 wherein the recess has a longitudinal expanse encompassing a hot rub strip region on a longitudinal expanse of the inwardly facing side of the body.

12. The method as recited in claim 11 wherein the step of filling the recess with a second metal alloy comprises depositing the second metal alloy into the recess as a weld deposit.

13. The method as recited in claim 10 wherein the step of removing a layer of the first metal alloy comprises creating the recess by at least one of cutting and grinding away of the first metal alloy in a central portion of the inwardly facing side of the body.

14. A method for manufacturing a blade outer seal segment for a gas turbine comprising the steps of:

forming a body having an outwardly facing side and an inwardly facing side having a circumferential expanse and a longitudinal expanse, the body formed of a first metal alloy having a first coefficient of thermal expansion; and providing a layer of a second metal alloy on the inwardly facing side, the second metal alloy having a second coefficient of thermal expansion, the second coefficient of thermal expansion being less than the first coefficient of thermal expansion.

15. The method as recited in claim 14 wherein the second metal alloy having a second coefficient of expansion comprises a metal alloy having a coefficient of expansion less than the first coefficient of expansion at body temperatures in excess of about 1850° F. (1850° C.).

16. The method as recited in claim 14 wherein the first metal alloy comprises a nickel based superalloy and the second metal alloy comprises a cobalt based superalloy.

17. The method as recited in claim 14 wherein the step of providing a layer of a second emtal alloy on the inwardly facing side comprises providing a layer of second metal alloy having a longitudinal expanse encompassing a hot rub strip region on a longitudinal expanse of the inwardly facing side of the body.

* * * * *